US008381860B2

(12) United States Patent
Noyer

(10) Patent No.: US 8,381,860 B2
(45) Date of Patent: Feb. 26, 2013

(54) TRUCK WITH AT LEAST THREE STEERED WHEELS

(75) Inventor: Michel Noyer, Beaupreau (FR)

(73) Assignee: Manitou BF, Ancenis (FR)

( * ) Notice: Subject to any disclaimer, the term of this patent is extended or adjusted under 35 U.S.C. 154(b) by 1330 days.

(21) Appl. No.: 11/785,822

(22) Filed: Apr. 20, 2007

(65) Prior Publication Data

US 2007/0251746 A1 Nov. 1, 2007

(30) Foreign Application Priority Data

Apr. 26, 2006 (FR) ...................................... 06 03749

(51) Int. Cl.
*B62D 61/06* (2006.01)

(52) U.S. Cl. ......................... 180/211; 180/411; 180/408

(58) Field of Classification Search .................. 180/211, 180/266, 210, 216, 221, 232, 233, 404, 425, 180/234, 441; 187/222
See application file for complete search history.

(56) References Cited

U.S. PATENT DOCUMENTS

| | | | | |
|---|---|---|---|---|
| 2,861,811 | A * | 11/1958 | Lassen | 280/43.11 |
| 3,346,131 | A * | 10/1967 | Lundell | 414/476 |
| 4,520,903 | A * | 6/1985 | Arnold et al. | 187/222 |
| 4,919,233 | A * | 4/1990 | Larsen et al. | 187/227 |
| 5,325,935 | A * | 7/1994 | Hirooka et al. | 180/211 |
| 5,788,452 | A * | 8/1998 | Brouwer et al. | 414/631 |
| 6,675,937 | B2 * | 1/2004 | De Leeuw et al. | 187/222 |

FOREIGN PATENT DOCUMENTS

| | | |
|---|---|---|
| EP | 0 625 478 | 11/1994 |
| EP | 0 953 540 | 11/1999 |
| EP | 1 270 496 | 1/2003 |
| GB | 1 203 574 | 8/1970 |
| NL | 1011313 | 8/2000 |

* cited by examiner

*Primary Examiner* — Kevin Hurley
*Assistant Examiner* — Levon Fiore
(74) *Attorney, Agent, or Firm* — Young & Thompson

(57) ABSTRACT

A truck includes at least three steered wheels (5, 6, 7) that are mounted on a chassis (1). The arrangement of the wheels relative to the chassis (1) is predetermined to increase the stability of the truck during the pivoting of the steered wheels (5, 6) and to protect the wheels in frontal mode.

10 Claims, 4 Drawing Sheets

TRUCK WITH AT LEAST THREE STEERED WHEELS

FIELD OF THE INVENTION

The invention relates to a motorized truck that comprises at least three steered wheels, in particular of the type able to be put on board at the rear of a transport vehicle.

BACKGROUND OF THE INVENTION

Carts that can be put on board on a transport vehicle such as a motor truck, able to be used in the loading and in the unloading of the motor truck and then to be attached to the rear of the latter to thus be transported, are known. This type of cart is generally of compact production so as to project beyond the motor truck by a small distance, its chassis being made so that the wheels are close to the front end of its loading fork.

For this purpose, the motorized trucks of the above-mentioned type generally comprise a chassis that is shaped like a forward-facing U, equipped with two front steered wheels and one rear steered wheel, so that the lifting means thus extend into their most retracted position between the lateral branches of the U-shaped chassis.

Certain trucks of the above-mentioned type comprise at least three steered wheels so as to allow handling in frontal mode and in lateral mode.

Each steered wheel is mounted on a direction mechanism with pivoting around a vertical axis between a first frontal mode position and a second lateral mode position that is perpendicular to the first position of the frontal mode.

The invention is particularly useful in its application to a motorized truck, able to be put on board at the rear of a transport vehicle, of the type that comprises a chassis that has a U-shaped conformation, equipped with two front steered wheels and one rear steered wheel, a control station and lifting means. These lifting means can comprise a telescopic arm that is mounted to pivot under the action of a lifting jack around an essentially horizontal axis that is located to the rear of the chassis essentially above said rear steered wheel or alternately can comprise a lifting mast of the type that is known in the art.

A first drawback of this on-board truck with three steered wheels results from the fact that in the lateral travel mode, the deformation and the reduction of the polygon or lifting triangle entrains a reduction in stability.

A second drawback of this on-board truck with three steered wheels derives from the risk of the load interfering with the front wheels in the lateral travel position, which may prevent the deposition of the load between the front wheels.

The document EP 0 625 478 A1 describes a cart with movable forks according to the above.

SUMMARY OF THE INVENTION

One object of the invention is to eliminate the drawbacks of the known technique by proposing a new structure of motorized cart that comprises at least three steered wheels and that has a sturdy conformation for protection of the steered wheels in frontal mode.

The invention has as its object a truck that comprises at least three steered wheels that are mounted on a chassis and means for actuating the orientation of at least two steered wheels between a frontal travel position and a lateral travel position, whereby the arrangement of the wheels relative to the chassis is predetermined to increase the stability of the cart during the switching from the frontal mode to the lateral mode, characterized by a mounting of the steered wheels inside the branches of the chassis in frontal mode.

According to the other alternative characteristics of the invention:

- The truck comprises an assembly of steered wheels allowing an increase of the track and the wheelbase of the truck during the pivoting of the steered wheels,
- The truck has a pivoting toward the outside of the steered wheels during the switching from the frontal travel position to the lateral travel position,
- The truck has stabilization means that are integral with the steered wheels during their pivoting,
- The truck has supports that can be folded back and that are able to support a load in transport mode of the truck,
- The supports that can be folded back are controlled by actuators,
- The chassis has abutment means of the supports that are folded back in a low position,
- The supports have a conformation that is suitable for the passage and the pivoting of the steered wheels,
- The truck has a U-shaped conformation that opens toward the front, a chassis with two lateral branches that carry two steered wheels on the inside.

BRIEF DESCRIPTION OF THE DRAWINGS

The invention will be better understood owing to the following description that is provided by way of nonlimiting example with reference to the accompanying drawings in which.

DETAILED DESCRIPTION OF EMBODIMENTS

In reference to FIGS. 1 to 4, the identical or functionally equivalent elements are referenced by identical reference numbers.

Figure 1:
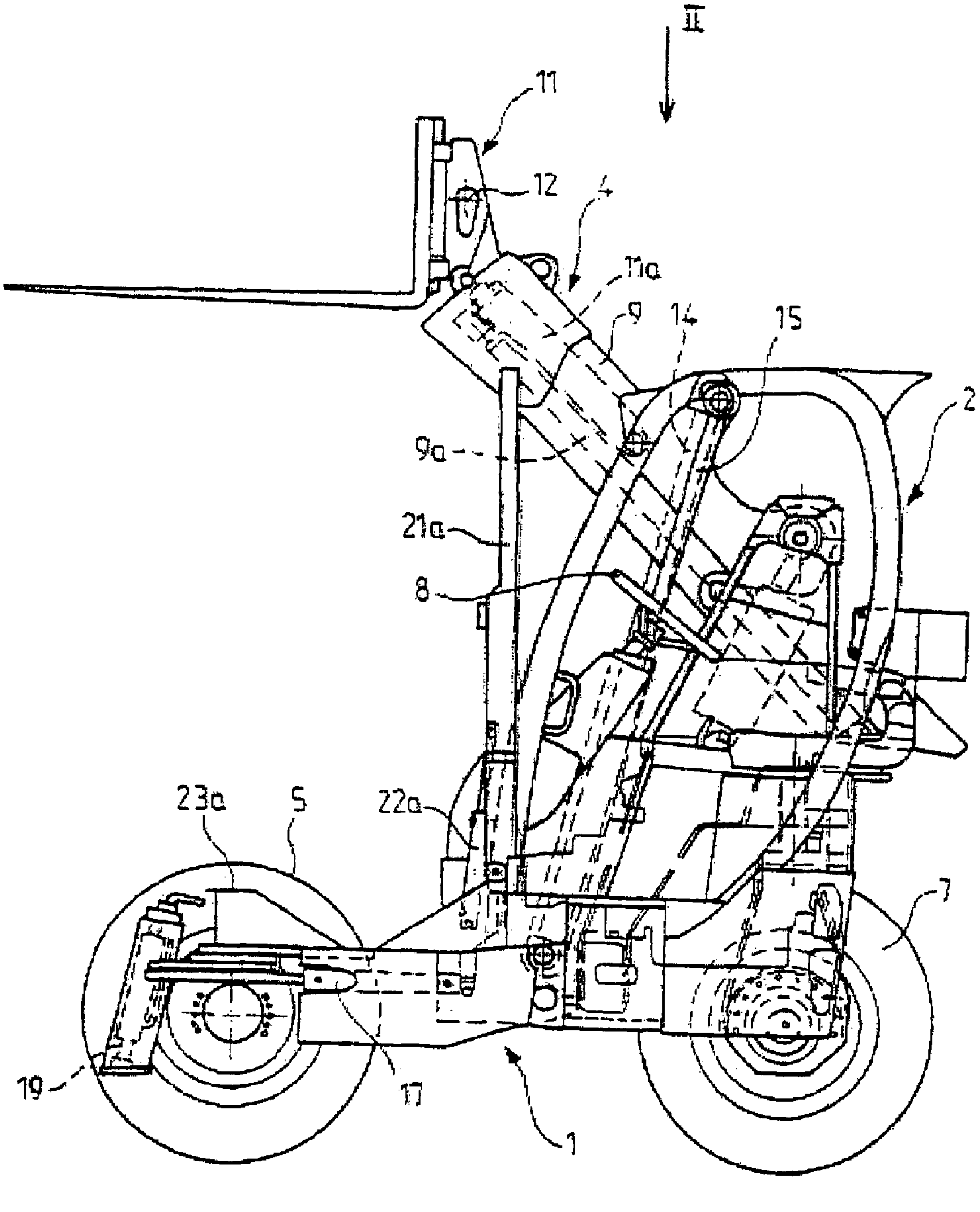
FIG. 1 diagrammatically shows an elevation view along arrow 1 of FIG. 2 of a truck according to the invention in the frontal travel position.
Figure 2:
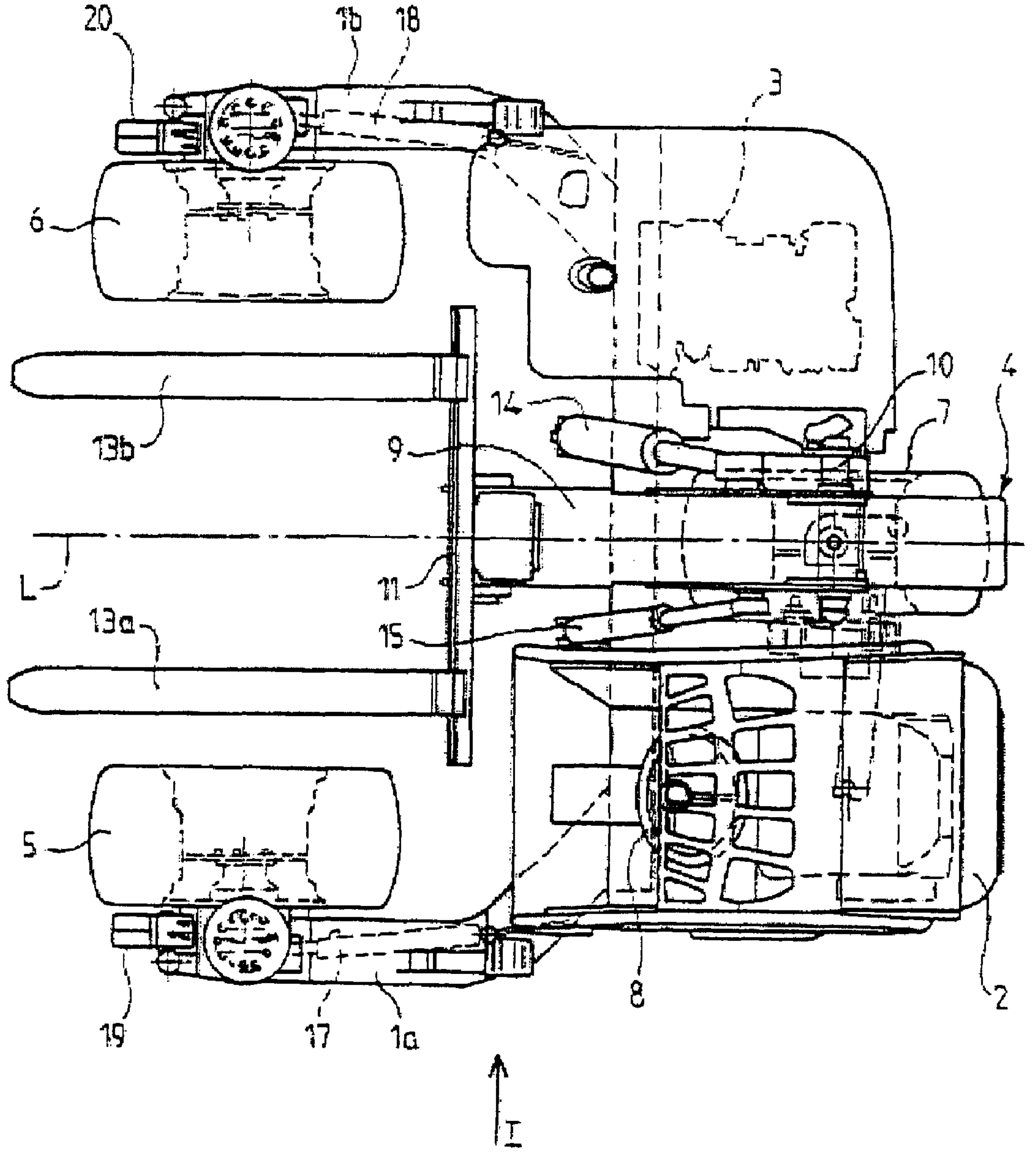
FIG. 2 diagrammatically shows a top view along arrow II of FIG. 1 of a truck according to the invention in the frontal travel position.

In FIGS. 1 and 2, a truck according to the invention comprises a chassis 1 that has a U-shaped conformation that opens toward the front, a control station 2, a drive train 3 and lifting means 4.

A branch 1*a* of the chassis carries a front wheel 5 while the other branch 1*b* carries the other front wheel 6. The rear steered wheel 7 is mounted essentially in the middle of the main body of the chassis. The rear steered wheel 7 is controlled by a steering wheel 8 that is located in the control station 2 that also comprises all the control elements of the lifting means 4.

The drive train 3 is preferably a group that comprises a heat engine that drives a hydraulic pump, whereby the necessary distribution and control elements are regrouped with the drive train 3 and controlled directly from the control station 2.

The lifting means 4 comprise a telescopic arm 9 that is mounted to pivot around an essentially horizontal axis 10 that is located behind the chassis 1 that is essentially above the rear steered wheel 7.

The control and driving station is located on one side of the truck; the drive train 3 is located on the side opposite the control and driving station, and the telescopic arm 9 in its lowered and retracted position that corresponds to the transport of a load switches between the driving station 2 and the drive train 3.

This arrangement thus provides an excellent visibility to the load and to the lifting means 4. Alternately, the lifting means 4 can comprise a lifting mast instead of a telescopic arm 9.

On its end removed from the pivoting axis 10, the telescopic arm 9 carries a gripping element 11 that can be oriented to pivot around a horizontal axis 12 under the action of an actuating jack 11*a*.

The gripping element 11 is preferably designed as a platform that supports forks 13*a*, 13*b*. The forks 13*a*, 13*b* can depart from a lowered and retracted position of the telescopic arm 9 that corresponds to the transport of a load, to switch to other horizontal or inclined positions in a direction to excavate or discharge.

The telescopic arm 9 can be extended under the action of an inside jack 9*a* and pivots under the action of a lifting jack 14 placed laterally relative to the arm and fixed to a bracket that is integral with the beam of the telescopic arm 9.

The truck is advantageously equipped according to the invention with a compensating jack that can keep the forks 13*a*, 13*b* horizontal during the pivoting of the arrow. Preferably, the lifting jack 14 and the compensation jack 15 are mounted on both sides of the beam of the telescopic arm 9, in a position that does not interfere with the visibility of the driver when the telescopic arm 9 is entirely lowered and retracted in transport position.

Advantageously, the entire lifting means 4 can be moved transversally so as to allow a precise adjustment of the positioning of the lifting means during the gripping of the load. In this case, the lifting means 4 that comprise the telescopic arm 9 can be moved in a directed and preferably hydraulically controlled movement under the action of translation means placed close to the pivoting axis 10: these translation means are then preferably hydraulic actuation means that comprise at least one hydraulic jack, whose actuation direction is essentially parallel to the pivoting axis 10.

According to the invention, the front wheels 5 and 6 are steered wheels whose orientations are coordinated starting from the driving station 2 to ensure a specific displacement mode so as to pivot by opening toward the outside to simultaneously increase the track and the wheelbase of the truck, as well as the lifting polygon of the truck.

In the example shown, the orientations of the steered wheels 5 and 6 are obtained by actuators 17 and 18, for example hydraulic jacks that are identical or symmetrical relative to the longitudinal axis T of the track.

Stabilizers 19 and 20 can be provided in the form of units that are integral with steered wheels 5 and 6.

Supports 21*a* and 21*b* that can be folded back and that can be actuated by hydraulic jacks 22*a*, 22*b* can also be provided to rest the load during travel.

These supports 21*a*, 21*b* that can be folded back rest in a low position on abutments 23*a*, 23*b* that are integral with the chassis 1 so as to prevent any risk of accident in the case of a hydraulic hose breaking.

Figure 3:
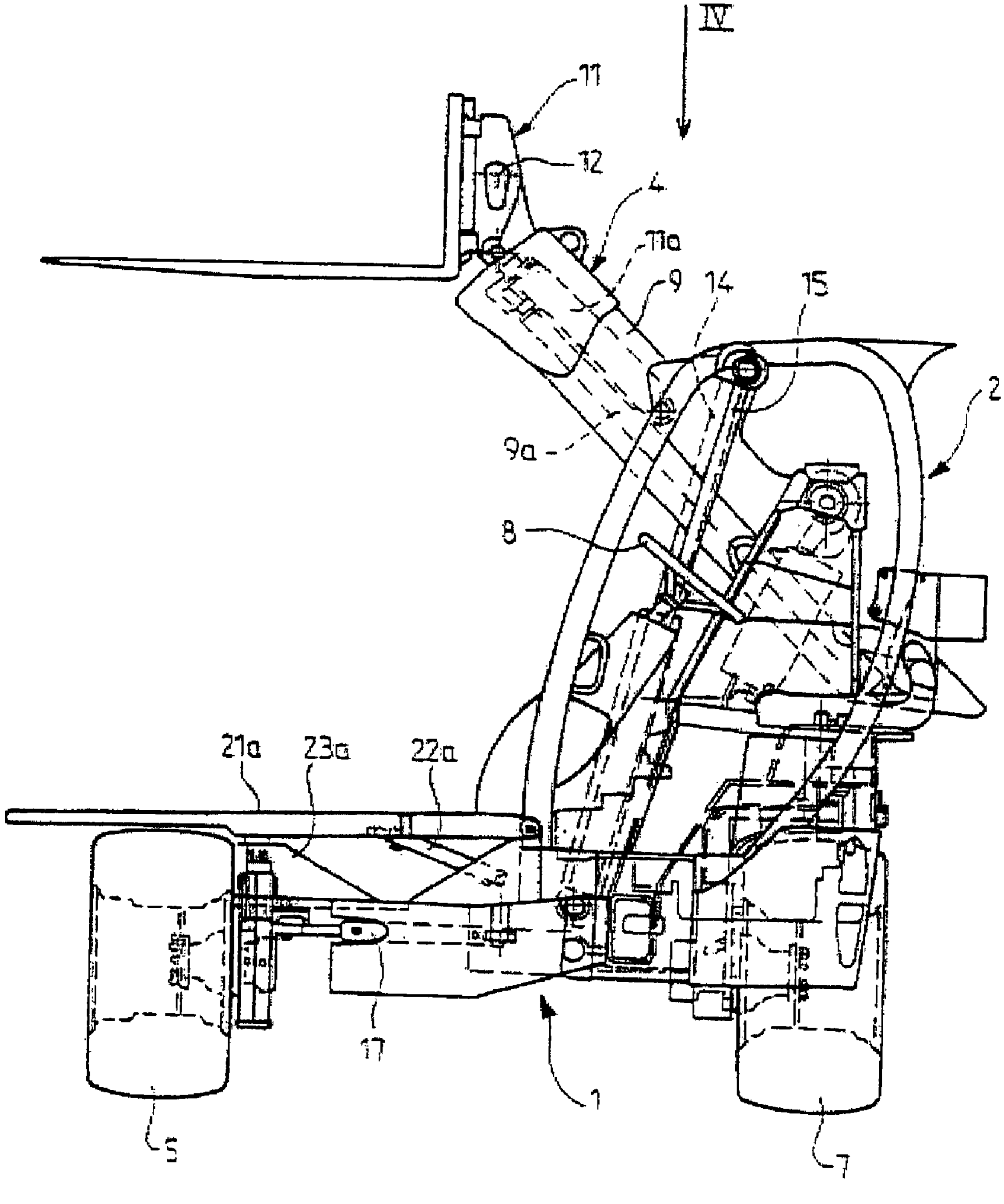
FIG. 3 diagrammatically shows an elevation view along arrow III of FIG. 4 of a truck according to the invention in the lateral travel position.
Figure 4:
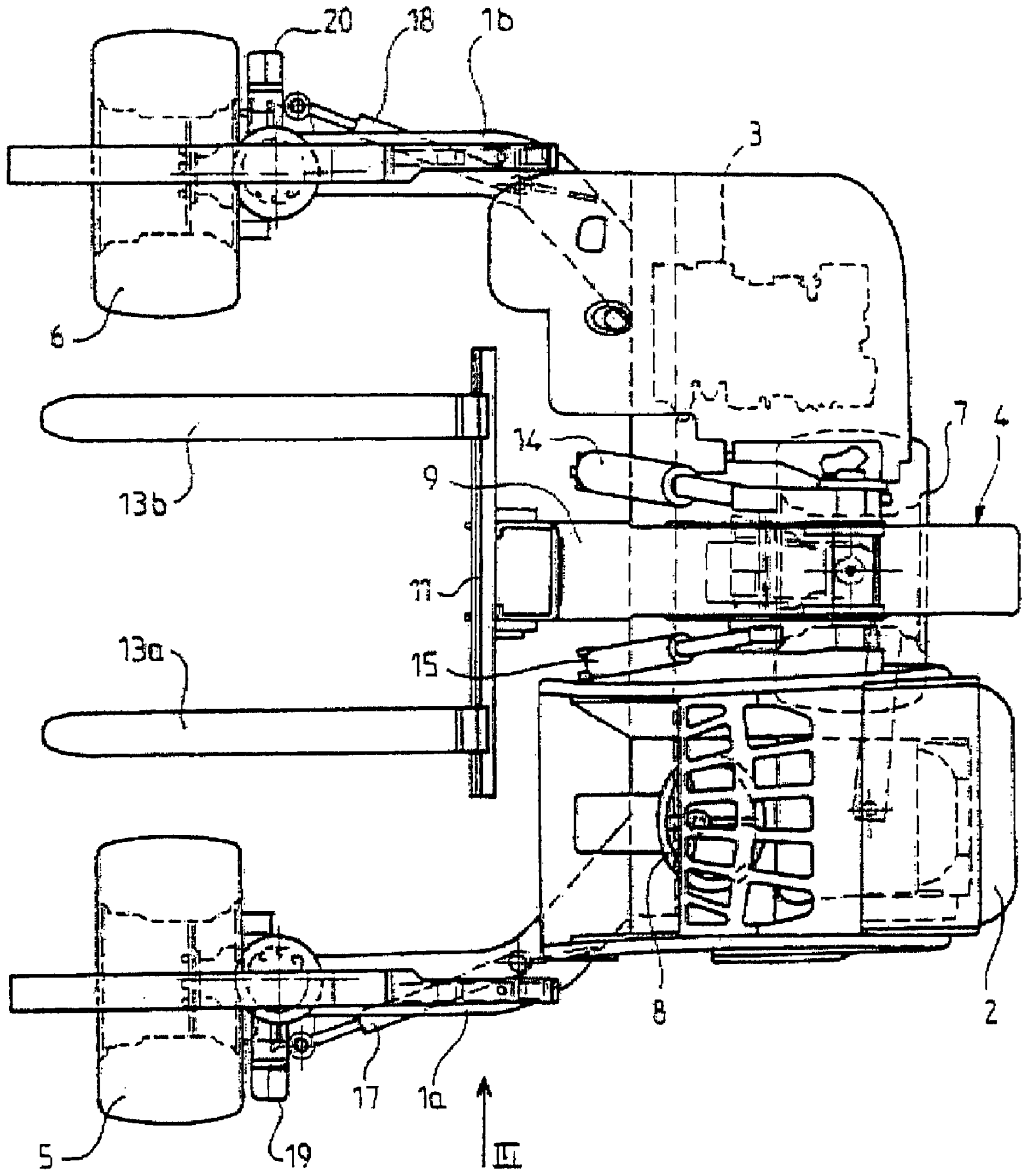
FIG. 4 diagrammatically shows an elevation view along arrow IV of FIG. 3 of a truck according to the invention in the lateral travel position.

In FIGS. 3 and 4, the truck described in reference to FIGS. 1 and 2, in a frontal travel position, is shown in the lateral travel position, after pivoting steered wheels 5 and 6 toward the outside and at a right angle.

In the pivoting movement, the stabilizers 19 and 20 pivot with the steered wheels 5 and 6.

The supports 21*a*, 21*b* that can be folded back and that rest on abutments 23*a*, 23*b* comprise front ends that are suitable for the passage of front wheels 5 and 6, for example, by going by tapering forward.

The comparison of FIGS. 3 and 4 that represent the lateral travel position with FIGS. 1 and 2 representing the frontal travel position leads to an increase of the track by about one third and an increase of the wheelbase by about twenty percent, and consequently an increase of the area of the lifting polygon of more than one half.

The invention makes it possible to obtain a stability that is higher than the stability of the trucks of the prior art.

In addition, thanks to the invention, the fact of mounting the front steered wheels 5 and 6 inside the branches 1*a*, 1*b* of the U-shaped chassis 1 makes it possible to ensure an opening of wheels 5 and 6 toward the outside during the pivoting to switch from the frontal travel position to the lateral travel position.

Finally, thanks to the invention, the mounting of the front steered wheels 5 and 6 inside the branches 1*a*, 1*b* of the U-shaped chassis 1 makes it possible to protect them from outside impacts, while adhering to the width imposed by the road dimensions in the frontal travel position and by allowing projection beyond the road dimensions in the lateral travel position.

The invention that is described in reference to a particular embodiment is in no way limited thereto but on the contrary covers any modification of shape and any variant embodiment within the scope and spirit of the invention.

Thus, one or more of the steered wheels 5, 6 or 7 can be driving wheels, the essential thing being to provide an arrangement of the truck that ensures not only a pivoting of the wheels toward the outside and an enlargement of the lifting polygon in lateral mode but also an improved sturdiness by the protection of the front steered wheels in frontal mode by the branches of the chassis.

The invention claimed is:

1. A truck that comprises:

a chassis having a U-shaped configuration;

three wheels mounted on said chassis, said three wheels comprising a rear wheel mounted substantially in a middle of a main body of the chassis, a first front steered wheel carried by a first branch of the chassis and a second front steered wheel carried by a second branch of the chassis; and actuators that respectively actuate an orientation of the first and second front steered wheels between a frontal travel mode position and a lateral mode position, an orientation of the first and second front steered wheels obtained by said respective actuators is configured so that the frontal travel mode position, the first and second front stored wheels are between the first and second branches of the chassis, and in the lateral mode position, the first and second front steered wheels are in front of and entirely outside of the first and second branches of the chassis.

2. A truck that comprises:

a chassis having a U-shaped configuration;

at least three steered wheels that are mounted on said chassis, said three steered wheels comprising a rear steered wheel mounted substantially in a middle of a main body of the chassis, a first front steered wheel carried by a first branch of the chassis and a second front steered wheel carried by a second branch of the chassis; and means for actuating an orientation of the first and second front steered wheels between a frontal travel mode position and a lateral mode position, an arrangement of the at least three steered wheels relative to the chassis is predetermined to increase stability of the truck during switching from the frontal travel mode position to the lateral mode position, wherein the orientation of the first and second front steered wheels is obtained by respective actuators identical or symmetrical relative to a longitudinal axis of the truck, in such a way that the first and second front steered wheels are steered from the frontal mode position and are between the first and second branches of the chassis, to the lateral mode position and open towards the front and the outside of the first and second branches of the chassis.

3. The truck according to claim 2, wherein the first and second steered wheels are mounted so as to increase the track and the wheelbase of the truck during switching from the frontal mode to the lateral mode.

4. The truck according to claim 3, wherein the first and second steered wheels are pivoted toward the outside during the switching from the frontal travel position to the lateral travel position.

5. The truck according to claim 2, further comprising a stabilization means that are integral with the steered wheels during their pivoting.

6. The truck according to claim 2, further comprising supports that can be folded back and that are able to support a load in transport mode of the truck.

7. The truck according to claim 6, wherein the supports that can be folded back are directed by actuators.

8. The truck according to claim 6, wherein the chassis has abutment means of the supports that are folded back in a low position.

9. The truck according to claim 6, wherein the supports have a configuration that is suitable to the passage and to the pivoting of the first and second steered wheels.

10. The truck according to claim 2 that is shaped like a forward-facing U, said chassis carrying said first and second steered wheels inside of said first and second branches.

* * * * *